Patented June 11, 1946

2,401,925

UNITED STATES PATENT OFFICE 2,401,925

ALKYLATION

Manuel H. Gorin, Dallas, Tex., assignor to Socony-Vacuum Oil Company, Incorporated, New York, N. Y., a corporation of New York No Drawing. Application October 28, 1941, Serial No. 416,864

5 Claims. (Cl. 260—683.4)

This invention relates to the manufacture of gasoline-boiling hydrocarbons by the catalytic alkylation of paraffins with olefins. More specifically, this invention is especially concerned with the alkylation of isoparaffins with ethylene.

The catalytic alkylation art for the manufacture of gasoline-boiling hydrocarbons from isoparaffins and olefins has received wide-spread and intensive study during recent years because of the commercial importance of alkylation processes for manufacturing aviation-type gasoline. As a result of these studies, many catalysts have been proposed and tried. It might be assumed, therefore, that any catalyst which could reasonably be expected or predicted to give improved or additional advantages in the process has been tested and evaluated.

Workers in the art are familiar with the fact that there is a sharp distinction between trying to alkylate with a rather reactive olefin, such as isobutylene, and trying to alkylate with the olefin, ethylene, which is known to be in a class by itself as an olefin for alkylation. Thus, concentrated sulfuric acid, which, incidentally, is the only commercially-used isoparaffin alkylation catalyst at the present time, is incapable alone of effecting any substantial alkylation with ethylene. This statement applies also to other catalysts which are excellent for alkylating with C4 and higher olefins, but which are capable of effecting alkylation with ethylene only when promoted by other compounds. For instance, Ipatieff and Pines (Patent Nos. 2,112,846 and 2,170,306) disclose that isobutane can be alkylated with butylenes in the presence of aluminum chloride alone at temperatures below 0° C. However, in Patent No. 2,174,883 these workers disclose that for alkylating isobutane with ethylene temperatures up to 40° C. should be used, and that the catalyst is not aluminum chloride alone, but rather must be aluminum chloride promoted with hydrogen chloride and preferably promoted also by the presence of olefins higher than ethylene.

Again, a disadvantage connected with catalytic processes involving aluminum chloride results from the fact that relatively large amounts of catalyst are required. This results in considerable catalyst consumption since the catalyst soon becomes deactivated by a sludge which forms as tar collects on the solid particles of the aluminum chloride suspended in the hydrocarbon reactants.

It is also known that isobutane can be alkylated with ethylene thermally, i. e., non-catalytically. However, this process requires very high temperatures and pressures, for example, 400–500° C. and 1,000 pounds per square inch and higher, rather than the low temperatures and pressures used in the above-mentioned catalytic processes. On the other hand, the thermal process gives substantial yields of neohexane (2,2-dimethylbutane) whereas, according to the literature and insofar as I am aware, neohexane has not been produced by any low-temperature, liquid phase process.

Since, under present conditions of operation, relatively small concentrations of ethylene are available in refinery gases or from other sources, commercial processes for the alkylation of paraffin hydrocarbons with ethylene to make high test gasolines will, in general, require a plant for the production of ethylene. The lower isoparaffins, such as isobutane and isopentane on the other hand, are available in larger amounts in natural gas and natural gasoline. For these reasons, ethylene should be considered the more expensive of the two reactants. It is desirable, therefore, to carry out these processes so that a maximum amount of high octane gasoline is obtained per unit of ethylene reacted, rather than per unit of isoparaffin reacted. This is best accomplished in the alkylation of isobutane with ethylene, for instance, by directing the alkylation toward the production of hexanes rather than to octanes and higher boiling products. Thus, when hexanes are formed, approximately three pounds of gasoline are produced per pound of ethylene reacted, while when octanes are formed, two pounds of gasoline are produced per pound of ethylene reacted. For decanes, one and two-thirds pounds of gasoline are produced per pound of ethylene reacted.

In all cases for which information is available in the prior art on the liquid phase catalytic alkylation of isobutane with ethylene, the hexane fraction constitutes less than half of the alkylate produced. Thus, in the alkylation of isobutane with ethylene, using promoted sulfuric acid, the hexane fraction constitutes approximately one-third of the product. Similarly, it appears from the information available, that the hexane fraction of the alkylate produced from isobutane and ethylene, using aluminum chloride promoted by hydrogen chloride plus more reactive olefins, constitutes only 25 per cent of the liquid product.

Although by itself, the formation of higher alkylates as the major portion of the liquid product constitutes a real disadvantage in the above-mentioned process, even more serious is the polymerization of ethylene to resinous high-boiling materials. This side reaction results both in the consumption of ethylene to form products of doubtful commercial value and in the more rapid de-activation of catalyst. This polymerization reaction is especially difficult to eliminate with metallic halide catalysts which are not appreciably soluble in hydrocarbons and which are promoted by hydrogen halides.

Accordingly, it is an object of this invention to provide a catalytic process for alkylating paraffins with ethylene which employs a novel catalyst for this reaction.

Another object of my invention is to provide a catalytic process for alkylating paraffins with ethylene which does not entail a substantial consumption of catalyst.

Another object is to provide a catalytic process for alkylating paraffins with ethylene which employs a catalyst that forms a homogeneous liquid phase with at least the paraffinic hydrocarbons whereby many advantages are obtained, such as simplified agitation requirements, smaller catalyst to paraffin mol ratios needed, reduced catalyst consumption, reduced olefin polymerization, etc.

Still another object is to provide a catalytic process for alkylating isobutane with ethylene which yields a predominant amount of hexanes.

A further object is to provide a process for manufacturing neohexane at low temperatures in the liquid phase.

A still further object is to provide a process of alkylating an isoparaffin of $n$ carbon atoms with ethylene which permits the production of predominantly one paraffinic isomer of $n+2$ carbon atoms.

The above and other objects will be apparent from the following description of my invention.

My invention comprises alkylating paraffins, and preferably isobutane, with ethylene in a liquid phase reaction in the presence of a catalyst which possesses appreciable solubility in light hydrocarbons which are in the liquid phase. Therefore, the catalyst dissolves in the liquid hydrocarbon reactants so that only one liquid phase is present in the reaction mixture and no solid phase is present. It is to be understood, however, that a gas phase may be present in the reaction mixture since one of the hydrocarbons, and particularly ethylene, or a catalyst promoter, if used, might be introduced into the reaction mixture in the gaseous state. Whether a completely homogeneous liquid system or a single liquid-gas system is obtained, is immaterial. It is only important in order to obtain all the advantages of the present invention, not to have two liquid phases or a liquid-solid system. Thus, for example, I have made the surprising discovery that there is a remarkable distinction in the alkylating activity of aluminum bromide for the above alkylation reaction as compared to that of other catalysts of which I am aware, such as, for example, promoted aluminum chloride, which form heterogeneous liquid systems or heterogeneous liquid-solid systems with the hydrocarbons. Therefore, it should be understood at the outset, that I have found that aluminum chloride and aluminum bromide are positively not equivalents for this process, as will be shown later herein.

My discovery of a process of alkylating paraffins with ethylene, in the presence of a catalyst which has substantial solubility in the light hydrocarbons so that the reaction mixture comprises a single liquid phase and no solid phase, contributes to the industry a process which has many advantages over prior processes described above.

For convenience, I shall speak of my catalysts hereinafter as "hydrocarbon soluble catalysts" and it is to be understood that by this term I mean catalysts which by themselves possess a substantial solubility in light hydrocarbons which are in the liquid phase so that sufficient catalyst goes into solution to give the desired catalytic effect.

Thus, my findings establish that at most, not more than mild agitation is required during the reaction, whereas, as is well known, violent agitation is required in processes which employ a catalyst, such as sulfuric acid or aluminum chloride, that forms a heterogeneous liquid-liquid or liquid-solid system with the hydrocarbon reactants. This is a particularly important advantage for processes involving alkylation with ethylene since such prior processes, for the most part, require relatively long reaction times in order to obtain good yields. In my process, for example, where a liquid isoparaffin, aluminum bromide, and gaseous ethylene comprise the reaction mixture, agitation is required only to dissolve initially the catalyst in the liquid isoparaffin and to improve and maintain contact between the gaseous olefin and the liquid hydrocarbon-catalyst mixture.

Another important advantage for hydrocarbon soluble catalysts is the possibility of carrying out the reaction with very much smaller catalyst to hydrocarbon mol ratios than are necessary in the case of hydrocarbon insoluble catalysts. The high degree of dispersion of the catalyst obtained in a homogeneous liquid phase system allows the highest degree of contact attainable between a catalyst and a liquid.

Still another important advantage of my process is that consumption of catalyst is markedly less with hydrocarbon soluble catalysts than with hydrocarbon insoluble catalysts. This distinction applies particularly to solid metal halides of the Friedel-Crafts type. As is known, a small amount of tar formation is usually associated with alkylation. This tar tends to coat the surface of a solid catalyst and to cause the particles of catalyst to stick together. This greatly reduces the activity of the whole catalyst mass and makes catalyst regeneration operations quite difficult. In the case of hydrocarbon soluble catalysts, however, only the small portion of the catalyst dissolved in the tar is reduced in activity. The catalyst which remains in solution in the lighter hydrocarbons is not affected.

I also have discovered still another important advantage in my process and that is that olefin polymerization is substantially reduced wherefore loss of olefins is reduced, fouling of the catalyst is reduced, and higher concentrations of olefins in the reaction mixture than previously accepted to be critical for alkylation are permissible, whereby shorter overall reaction times are attainable. I have advanced the following theory to explain this reduction in the olefin polymerization side reaction: In heterogeneous systems, polymerization is favored with respect to alkylation by the tendency of the olefins to concentrate in the catalyst layer or at the catalyst-hydrocarbon interface. In the case of a homogeneous system, however, the catalyst molecules are uniformly dispersed throughout the hydrocarbon liquid, i. e., there is no separate catalyst layer or phase. Therefore, it is impossible in a homogeneous system for the olefin to become more concentrated near the catalyst surface than it is in the entire reaction mixture.

The alkylation of paraffins with olefins in the presence of hydrocarbon soluble catalysts involves the important variable of catalyst concentration. No completely comparable variable exists in heterogeneous liquid-liquid or liquid-solid catalytic systems. This leads to another far-reaching embodiment of my invention, namely, that by controlling the concentration of the catalyst it is possible to establish and control stages in the alkylation reaction whereby products can be obtained containing predominantly one isomer, since apparently different isomers are produced in different stages of the reaction. This embodiment of the invention is clearly illustrated by my findings in alkylating isobutane with ethylene in the presence of varying amounts of aluminum bromide. Thus, I have found that with aluminum bromide concentrations below one mol per cent, the hexane fraction of the alkylate consists entirely of a single isomer, viz., 2,3-dimethylbutane of octane number 95 and boiling point 58° C. This may be considered a primary alkylate. Then at higher catalyst concentrations considerable amounts of 2,2-dimethylbutane (neohexane) and small amounts of 2-methylpentane are formed as well as 2,3-dimethylbutane. Then by employing still higher concentrations of catalyst and longer contact time, it is possible to obtain a major part of the hexane fraction as neohexane.

It appears, therefore, that in order to produce neohexane, sufficiently vigorous conditions are necessary to give a secondary stage alkylation. These vigorous conditions for neohexane production can be obtained by balancing of contact time and catalyst concentration, that is, by using longer contact times smaller concentrations of catalyst may be used. As mentioned above, insofar as I am aware, neohexane has never before been produced in detectable amounts by means of the catalytic liquid phase alkylation of isobutane with ethylene.

I have observed still another feature in connection with catalyst concentration. In most processes of alkylating isobutane with ethylene there are formed pentanes, heptanes and nonanes as well as the expected hydrocarbons, hexanes, octanes and decanes. When relatively large amounts of aluminum bromide are used I obtain this same result. However, when the amount of aluminum bromide is 0.5 mol per cent or less, the formation of pentanes and heptanes and nonanes is completely eliminated. It also is interesting to note that when relatively small amounts of catalyst are used so that the only hexane isomer produced is 2,3-dimethylbutane that this hexane may be separated out in pure form by relatively simple fractional distillation. This hexane of high octane number (approximating that of neohexane) and excellent lead susceptibility can be used to make aviation gasolines of exceptional quality. Of particular interest is the blending of this material with isopentane, heavier alkylates, and tetraethyl lead to produce full range aviation fuels of octane number greater than 100. Because the vapor pressure of this hexane, 2,3-dimethylbutane, is lower than that of neohexane, relatively more isopentane can be incorporated in these blends than could be incorporated in corresponding blends with neohexane. This factor allows a more economical utilization of this valuable hexane since isopentane is readily obtainable in large amounts from various sources.

Therefore, from a consideration of my work, I recommend that for the production of only the primary alkylate, for example, where 2,3-dimethylbutane is the only hexane, it is preferable to use less than one mol per cent of AlBr₃. While, on the other hand, for the production of neohexane, preferably amounts of AlBr₃ greater than three mol per cent should be employed; however, as noted above, longer contact times permit the use of smaller catalyst concentrations.

Perhaps one of the most striking features of using aluminum bromide as a catalyst for alkylating with ethylene is the fact that promoters are entirely unnecessary, and this is true in either a homogeneous or a heterogeneous reaction system. That is to say, truly outstanding results are obtained in the complete absence of any promoters, and such are the results shown herein (unless specified otherwise), although it is to be understood that promoters, as, for example, hydrogen halides, water, alkyl halides, etc., may be used if desired.

A still further important feature of my process is that isobutane can be alkylated with ethylene to give a reaction product which consists predominantly of hexanes.

The temperature and pressure conditions of my process are not particularly critical, but rather are just generally low temperature and low pressure operations. Therefore, temperature and pressure ranges are cited here merely to illustrate specifically conditions which will give feasible operations. Thus, reasonable limits of temperature and pressure for these processes involving alkylation of isoparaffins with ethylene in the presence of hydrocarbon soluble catalysts are, say, about −10 to about 70° C. and about 20 to about 250 pounds per square inch gauge pressure.

The hydrocarbon charging stocks for my process may be obtained from any convenient source as is well understood in the art at this time.

During my work on this invention I have discovered that in order to derive the full benefit of all the advantages set forth hereinabove for using a hydrocarbon soluble catalyst it is quite important that the reaction be carried out in a reactor whose surfaces have no catalytic influence on the constituents of the reaction mixture under the alkylation conditions. Therefore, in general, reactors should be used which do not expose metallic surfaces to the reaction mixture. For instance, it will be recalled that my studies have shown that less olefin polymerization is obtained when using hydrocarbon soluble catalysts than when using hydrocarbon insoluble catalysts. If the reaction is carried out in a reactor which presents surfaces of, say, iron or copper to the reaction mixture some of the advantages of the hydrocarbon soluble catalyst are lost. Thus, I have found that much better results are obtained with, for instance, lacquer-coated or glass-lined reactors than with steel reactors.

In order to establish clearly the marked distinction between my present invention and processes known to the art for alkylating with ethylene comparative data are given below which are taken from my operations and from two typical prior art processes, namely aluminum chloride alkylation and thermal alkylation, this latter process being the only commercial operation up to the present time directed to the manufacture of hexanes.

*Comparison of AlBr₃ and AlCl₃ alkylation*

| Catalyst | Mol percent of catalyst | Yield of alkylate | Olefin polymerization |
|---|---|---|---|
| AlBr₃ alone | 0.2 | Considered as 100%. | Negligible. |
| AlCl₃+HCl | 0.2 | Negligible | do |
| AlCl₃ alone | 5.0 | do | |
| AlCl₃+HCl | 5.0 | 25% | Predominant reaction. |

Each of the above reactions was carried out at 10° C. and 90 pounds pressure. Therefore, it can be seen that with the same amount of AlCl₃ (0.2 mol %) no result is obtained even when the AlCl₃ is promoted. Moreover, even when 5.0 mol per cent of AlCl₃ is used alone, no result is obtained, and while some alkylation is obtained when the 5.0 mol per cent of AlCl₃ is promoted, the yield is only 25% of that obtained with 0.2 mol per cent of unpromoted AlBr₃. Moreover, with 5.0 mol per cent of promoted AlCl₃ the major part of the ethylene is polymerized, whereas polymerization is negligible in my process.

*Comparison of AlBr₃ and thermal alkylation*

| Process | Temp., °C. | Pressure, #/sq. in. | # gasoline per # C₂H₄ | # high octane No. hexane per # C₂H₄ |
|---|---|---|---|---|
| AlBr₃ alkylation | 10 | 90 | 2.54 | 1.67 |
| Thermal alkylation | 504 | 4500 | 1.55 | 0.69 |

It, of course is quite clear from the above that a much larger yield of high octane hexane per pound of ethylene is produced by my process. It also is worthy of note that in the thermal alkylation the gasoline-boiling alkylate contains appreciable amounts of olefins thereby reducing its value for aviation gasoline, whereas my process yields a gasoline-boiling alkylate which is substantially completely saturated. Thus, my alkylate presented in the tables above consisted of approximately 65%, 2,3-dimethylbutane, 25% octanes, 5% decanes and 5% higher boiling material. The octanes and decanes are highly branched isomers of the type produced from isobutane and butylenes and, therefore, are valuable also for the production of high octane aviation fuels.

In order to illustrate the invention further, the following specific examples are given. These examples also show the effect of varying the concentration of the hydrocarbon soluble catalyst.

*Example I*

To a solution of 0.2 mol per cent of AlBr₃ in 295 parts by weight of isobutane contained in a glass-lined pressure vessel and fitted with a glass inlet tube, forty-one parts by weight of ethylene were added over a period of nine hours. During the addition of ethylene the average temperature was 20° C. and the average pressure 80 pounds per square inch. The mixture was allowed to remain in the reactor for an additional period of ten hours. It was then washed several times with water to remove the dissolved catalyst. The isobutane was then stripped from the liquid product. Ninety-nine parts by weight of liquid product were obtained. Of this amount, 71 parts by weight were 2,3-dimethylbutane (B. P. 58° C., octane Number 95). The remaining product (28 parts by weight) consisted largely of isomeric highly branched octanes (B. P. 99–115° C.). A small amount of decanes and minor amounts of higher boiling hydrocarbons were also formed.

The isobutane and ethylene charge stocks were dried over Activated Alumina.

*Example II*

In a similar experiment to Example I, with 1.0 mol per cent of AlBr₃, 35 parts by weight of ethylene were added over a period of 3.0 hours. The average pressure during the addition of ethylene was 50 pounds per square inch and the average temperature 15° C. The reaction mixture and catalyst remained in contact for an additional period of six hours before washing to remove the catalyst. The products obtained are listed below:

Parts by weight
Total alkylate _____ 101
Isopentane _____ 13
2,2-dimethylbutane _____ 3
2,3-dimethylbutane _____ 62
C₇+ _____ 23

The material boiling above 2,3-dimethylbutane consisted largely of isomeric highly branched octanes.

*Example III*

In an experiment similar to Example I, with 5.0 mol per cent of AlBr₃ plus 0.025 mol per cent of water, 35 parts by weight of ethylene were added over a period of 1.1 hours. The average temperature was 17° C. and average pressure 35 pounds per square inch during the addition of ethylene. The reaction mixture was allowed to remain in contact with the catalyst for an additional period of sixty hours. The products obtained are listed below:

Parts by weight
Total alkylate _____ 125
Isopentane _____ 56.5
n-Pentane _____ 7.6
2,2-dimethylbutane _____ 27.4
2,3-dimethylbutane } 14.6
2-methyl pentane }
C₇+ _____ 15.7

The material boiling above the hexane range consisted of heptanes, octanes and nonanes along with traces of higher boiling materials.

*Example IV*

This experiment was carried out in the apparatus described in Example I. To 282 parts by weight of isopentane containing 0.5 mol per cent of AlBr₃ in solution, 21 parts by weight of ethylene were added over a period of 6 hours. The contents of the reactor were allowed to remain in contact for an additional period of 11 hours before washing to remove the catalyst. The average temperature was 20° C. and pressure 65 pounds per square inch. The alkylate consisted almost entirely of heptanes and nonanes, together with a minor amount of higher boiling hydrocarbons. More than 70% of the heptane fraction was made up of a single isomer, 2,3-dimethyl pentane. The total amount of alkylate obtained was 69 parts by weight. The heptane fraction constituted 71% by weight of the total alkylate.

In discussing the invention, for simplicity I have referred only to alkylation with olefins. However, it is to be understood that the corresponding olefin halide might be used in place of the straight olefin, as for example, ethyl bromide might be charged to the reaction for alkylating the isoparaffin rather than charging ethylene into the reaction. Accordingly, it is to be understood herein, that where I use the term "olefin" or "ethylene" that the corresponding alkyl halide should be considered an equivalent reactant for the processes.

Furthermore, it should be understood that wherein I speak of the reaction mixture containing no solid phase and only one liquid phase, I mean the hydrocarbon reactants and the catalyst and the catalyst promoter, if used, since, of course, products or by-products of the reaction, such as, for example, small quantities of tarry material, may be in a solid, semi-solid or separate liquid phase.

I claim:

1. The process of catalytically synthesizing paraffinic hydrocarbons of gasoline boiling range consisting predominantly of the hexane 2,3-dimethyl butane which comprises alkylating isobutane in the liquid phase with ethylene in a reaction zone under alkylating conditions in the presence of a solution of aluminum bromide in an essentially paraffinic hydrocarbon solvent as the effective catalytic agent, while maintaining the concentration of aluminum bromide in the solution between a catalytically effective amount and not more than 3 mol per cent on the basis of the total paraffinic hydrocarbons in the reaction zone.

2. The process of catalytically synthesizing paraffinic hydrocarbons of gasoline boiling range which comprises alkylating an isoparaffin in the liquid phase with ethylene in a reaction zone under alkylating conditions in the presence of a solution of aluminum bromide in an essentially paraffinic hydrocarbon solvent as the effective catalytic agent, while maintaining the concentration of aluminum bromide in the solution between a catalytically effective amount and not more than 3 mol per cent on the basis of the total paraffinic hydrocarbons in the reaction zone.

3. The process of catalytically synthesizing paraffinic hydrocarbons of gasoline boiling range consisting predominantly of the hexane 2,3-dimethyl butane which comprises alkylating isobutane in the liquid phase with ethylene in a reaction zone under alkylating conditions in the presence of a solution of aluminum bromide in an essentially paraffinic hydrocarbon solvent as the effective catalytic agent, while maintaining the concentration of aluminum bromide in the solution between a catalytically effective amount and not more than about one mol percent on the basis of the total paraffinic hydrocarbons in the reaction zone.

4. The process of catalytically synthesizing paraffinic hydrocarbons of gasoline boiling range consisting predominantly of the hexane 2,3-dimethyl butane which comprises alkylating isobutane in the liquid phase with ethylene in a reaction zone under alkylating conditions of temperature and pressure in the presence of a solution of aluminum bromide in an essentially paraffinic hydrocarbon solvent as the effective catalytic agent while maintaining the concentration of aluminum bromide in the solution between a catalytically effective amount and not more than 3 mol percent on the basis of the total paraffinic hydrocarbons in the reaction zone, and correlating the contact time of the reactants and catalyst with the catalyst concentration, reaction temperature and degree of contacting so that 2,3-dimethyl butane is the major product of the reaction.

5. The process of catalytically synthesizing paraffinic hydrocarbons of gasoline boiling range consisting predominantly of the hexane 2,3-dimethyl butane which comprises alkylating isobutane in the liquid phase with ethylene in a reaction zone at a temperature between about $-10°$ C. and about 70° C. and at a pressure between about 20 and 250 pounds per square inch in the presence of a solution of aluminum bromide in an essentially paraffinic hydrocarbon solvent as the effective catalytic agent while maintaining the concentration of aluminum bromide in the solution between a catalytically effective amount and not more than 3 mol percent on the basis of the total paraffinic hydrocarbons in the reaction zone, and correlating the contact time of the reactants and catalyst with the catalyst concentration, reaction temperature and degree of contacting so that 2,3-dimethyl butane is the major product of the reaction.

MANUEL H. GORIN.